United States Patent Office 3,796,790
Patented Mar. 12, 1974

3,796,790
PROCESS FOR RECOVERING CONCENTRATED
PHOSPHORIC ACID
Aurelio F. Sirianni and Ira E. Puddington, Ottawa,
Ontario, Canada, assignors to Canadian Patents and
Development Limited, Ottawa, Ontario, Canada
Continuation-in-part of application Ser. No. 827,993,
May 26, 1969. This application Apr. 25, 1972,
Ser. No. 247,472
Int. Cl. C01f 1/00; C22b 29/00
U.S. Cl. 423—166
18 Claims

ABSTRACT OF THE DISCLOSURE

A process is provided for separating phosphoric acid (of high strength) directly from its suspension with a gelatinous or a finely divided precipitate, such as, for example, the calcium sulfate product first formed in a process for producing phosphoric acid. The process involves treating the suspension both with a particularly recited surfactant and a particularly recited minimum amount of a bridging liquid and agitating until dense agglomerates form. Then the phosphoric acid is separated easily from the agglomerates, e.g. by decanting, filtering or centrifuging.

BACKGROUND OF THE INVENTION

1. Field of the invention

Figure 1:
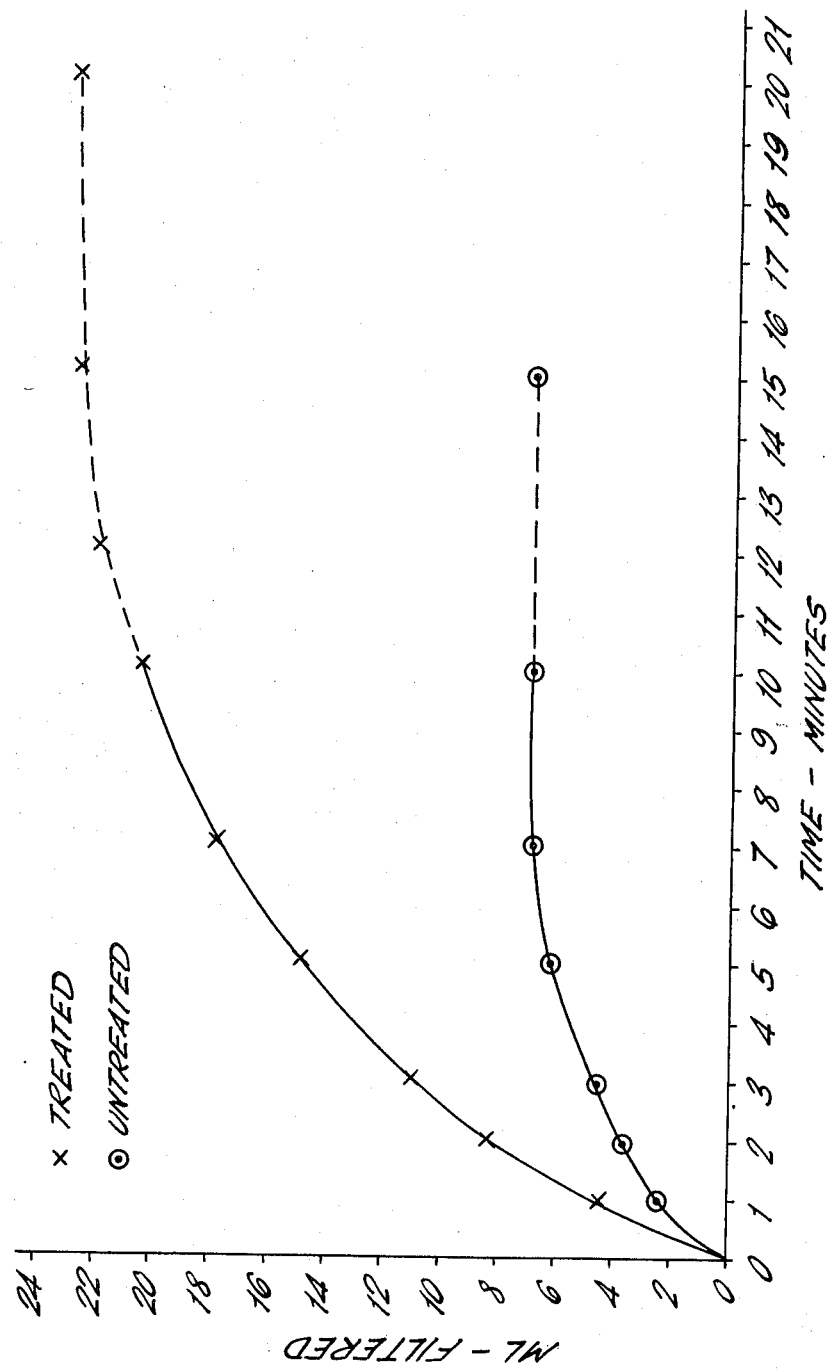

This application is a continuation-in-part of Ser. No. 827,993, filed May 26, 1969 and now abandoned.

This invention relates to improvements in the process of manufacturing phosphoric acid. More particularly, it relates to a process for separating phosphoric acid from gelatinous or finely divided calcium sulfate.

2. Description of the prior art

Large quantities of phosphoric acid are used in the fertilizer industry in the form of soluble phosphate. The phosphorus is usually derived from phosphate rock, $Ca_3PO_4 \cdot CaF_2$, where the fluoride is replaceable with a chloride or with a hydroxyl group. The mineral also contains small amounts of iron, alumina, carbonates and siliceous matter as contaminants.

The natural raw ore is usually useless as a fertilizer owing to its extremely low solubility. However, triple super-phosphate can be formed by reacting phosphate rock with ortho-phosphoric acid according to the following scheme:

$$Ca_3(PO_4)_2 \cdot CaF_2 + 6H_3PO_4 \rightarrow 4Ca(H_2PO_4)_2 + 2HF$$

There is usually enough $SiO_2$ in the rock to react with the HF, which thus volatilizes as fluosilicic acid.

By digesting the slurry after the addition of the phosphoric acid, considerable quantities of HF are removed by volatilization.

The phosphoric acid is liberated with sulfuric acid as follows:

$$Ca(H_2PO_4)_2 + H_2SO_4 \rightarrow CaSO_4 + 2H_3PO_4$$
or
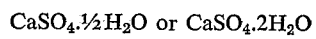
$$CaSO_4 \cdot \tfrac{1}{2}H_2O \text{ or } CaSO_4 \cdot 2H_2O$$

The calcium sulfate formed is usually in a gelatinous or very finely divided state, and as a consequence, the phosphoric acid formed is difficult to separate by settling or by filtering the solid matter. It is well known that the difficulty of producing rapidly filterable gypsum increases appreciably as the phosphoric acid concentration increases (see, for example, "Phosphorus and Its Compounds," volume II, J. R. Van Wazer, ed, Interscience Publishers Inc., 1961). As a consequence, in most commercial procedures for producing phosphoric acid, steps have been taken to dilute the phosphoric acid from an initial concentration in excess of 85% by weight (as orthophosphoric acid) to a concentration of 35–45% by weight (as orthophosphoric acid).

In present commercial practice, the calcium sulfate slurries are separated from the phosphoric acid by first diluting the phosphoric acid with water to 35–45% by weight and then filtering. This procedure is deficient in that the filtration step is slow and cumbersome and the acid recovered is diluted which must then be concentrated. Many suggestions have been made on how to improve the aforesaid procedure for separating the calcium sulfate slurries both to speed up the filtration step, and to avoid the step of diluting the phosphoric acid. One suggestion has been to add salts of bivalent metals which are soluble under the reaction conditions to the monocalcium phosphate before reacting the monocalcium phosphate with sulfuric acid.

Another suggestion has been to control the ratio of sulfuric acid to monocalcium phosphate in the hemihydrate crystallizer, i.e., by maintaining the quantity of sulfuric acid introduced at less than the stoichiometric equivalent of the calcium content of the monocalcium phosphate present.

Still another suggestion has been to add a flocculating agent for example, water-soluble high molecular weight synthetic polymers, such as, for example, polyacrylamides or hydrolyzed polyacrylonitrile resin or salts thereof, to the reacted mixture of phosphoric acid and sulfuric acid, thus allegedly enabling the easy separation of the gypsum solids from the diluted (35–45% by weight) phosphoric acid.

Still another suggestion for improving the recovery of phosphoric acid has been to agitate the slurry of acidic inorganic phosphates containing suspended solids with an organic saponification agent, e.g. tall oil, soap skimmings, tall oil pitch, the resinous fraction of tall oil, the fatty acid fraction of tall oil, the unsaponifiable fraction of tall oil, the aliphatic fatty acids containing from about 10 to about 20 carbon atoms, the alkali metal soaps thereof and mixtures of such materials, and with an alkali metal silicate inorganic clarification agent, thus allegedly enabling the easy filtration of the gypsum solids from the diluted (35–45% by weight) phosphoric acid.

Yet another suggestion for clarification of such inorganic phosphate solutions containing suspended impurities has been to mix the solution with an amine clarification agent in an amount effective to increase the settling rate of the suspended solids, thus allegedly enabling the easy separation of the gypsum solids from the diluted (35–45% by weight) phosphoric acid.

A still further suggestion for increasing the filtration rate of the normally difficulty filterable gypsum slurries obtained in manufacturing phosphoric acid has been to carry out the reaction of the sulfuric acid with the calcium phosphate in the presence of a small amount of an additive of the alkyl aryl sulfonic acid type, and preferably the alkali metal salts of such acids, thus enabling the more rapid separation of the gypsum solids from the diluted (35–45% by weight) phosphoric acid.

In spite of these many suggestions, there still remains the need to recover such phosphoric acid in high strength (e.g. 60% by weight or higher) from an aqueous slurry with calcium sulfate without the prior steps of dilution, followed, after filtration, by concentration or evaporation. Also even where dilution is carried out, it would be desirable to speed up the filtration step.

SUMMARY OF THE INVENTION

1. Aims of the invention

An object of a broad aspect of this invention is the provision of a process for separating phosphoric acid from gelatinous or finely divided calcium sulfate suspensions containing phosphoric acid.

An object of another aspect of this invention is the provision of a process for preparing high strength phosphoric acid from phosphate rock and phosphoric acid and sulfuric acid, without the necessity of carrying out the redundant steps of first dilution, and then of concentration or evaporation.

An object of yet another aspect of the present invention is to provide a process for separating high strength phosphoric acid from admixture with such acid and gelatinous or finely divided calcium sulfate suspensions using an improved filtration step.

2. Broad statement of invention

By one aspect of this invention, a process is provided for the separation of phosphoric acid from a suspension of a gelatinous or finely divided precipitate associated therewith, e.g. the calcium sulfate produced during a procedure for producing phosphoric acid, the process comprising: agitating the suspension both with a surfactant selected from the group consisting of straight chain alkyl sulfates, branched chain alkyl sulfates and benzene sulfonic acids, straight chain alkyl benzene sulfonates, branched chain alkyl benzene sulfonates, straight chain alkyl sulfates, branched chain alkyl sulfates and petroleum sulfonates in an amount of about 0.1 to about 4% by weight, based on the weight of solids in the suspension, and with a bridging liquid consisting of a liquid petroleum hydrocarbon in an amount of not less than about 1% by volume (absolute), generally in an amount of about 2% to about 150% by volume (absolute) and preferably in an amount of about 10% to about 150% by volume (absolute) of the solids in the suspension, until substantially complete production of agglomerates of said precipitate are formed; and then separating the phosphoric acid from the agglomerates, e.g. by decanting, or by filtration, or by centrifuging.

3. Variants of the invention

By one variant of the process of this invention, the suspension of gelatinous or finely divided precipitate which is to be separated from the phosphoric acid is formed by reacting a phosphate rock with concentrated phosphoric acid, thereby to form a suspension of superphosphate and phosphoric acid, and wherein the superphosphate is reacted with sulfuric acid, thereby forming phosphoric acid and the calcium sulfate precipitate.

By other variants of such process, the treatment of the gelatinous or finely divided calcium sulfate precipitate with the surfactant and with the bridging liquid can be achieved in a "one-step" process, where both the surfactant and the bridging liquid are used simultaneously, and in two, alternative "two-step" processes, namely (a) where the surfactant is used first and then the bridging liquid added later, or (b) where the bridging liquid is added first and the surfactant is added later.

4. General description of the process

Agitation preferably is carried out vigorously and quickly with a horizontal reciprocating motion, followed by a rolling motion of slower speed than that of the horizontal reciprocating motion. Such types of agitators as horizontal reciprocating shakers, paint shakers, Spex Mixers (the registered trademark of a type of mixer), and other forms of agitation, e.g. stirring, churning or pumping, are generally satisfactory. It has been noticed that slower agitation enables the agglomerates to become larger.

One of the essential steps in the process provided by this invention involves the addition, to the mixture of the phosphoric acid and the finely divided inorganic precipitate, of a surfactant selected from the group consisting of straight chain alkyl benzene sulfonic acids, branched chain alkyl benzene sulfonic acids, straight chain alkyl benzene sulfonates, branched chain alkyl benzene sulfonates, straight chain alkyl sulfates, branched chain alkyl sulfates, and petroleum sulfonates. Examples of such surfactants include sulfonic acid of branched alkyl benzene, sulfonic acid of a linear alkyl benzene, sodium alkyl benzene sulfonate, petroleum sulfonates, e.g. that known by the trademark of Bryton 430, sodium sulfonate of linear alkyl benzene, and dodecyl benzene sulfonic acid, namely, that known by the trademark of Hartex. In addition, it is also possible to use straight chain alkyl sulfates, e.g. dodecyl sodium sulfate.

The amount of such surfactant agglomeration promoting agent which should be used ranges from about 0.1 to about 4% by weight, based on the weight of the solids therein. An amount usually used is about 1% by weight. Generally speaking, at least an adsorbed partial monolayer of surfactant on the surface of the calcium sulfate is required.

A second essential step in the process provided by an aspect of this invention is the addition, to the mixture of phosphoric acid and the finely divided inorganic precipitate, of a bridging liquid namely, a liquid hydrocarbon. Examples of such liquids include petroleum fractions, namely naphtha, kerosene, fuel oils, low viscosity processed oils, gas oils, and the straight petroleum aliphatic solvent known by the trademark of Varsol.

The amount of such bridging liquid used must be not less than about 2% by volume (absolute) and generally would range from about 2 to about 150% by volume and preferably from about 10% to 150% by volume (absolute of the solids, as measured by liquid displacement) of the gelatinous or finely divided calcium sulfate. The amount of such bridging liquid which may be used may preferably be substantially of the same order as the volume of the inorganic solids.

5. Brief description of the drawings

Figure 2:
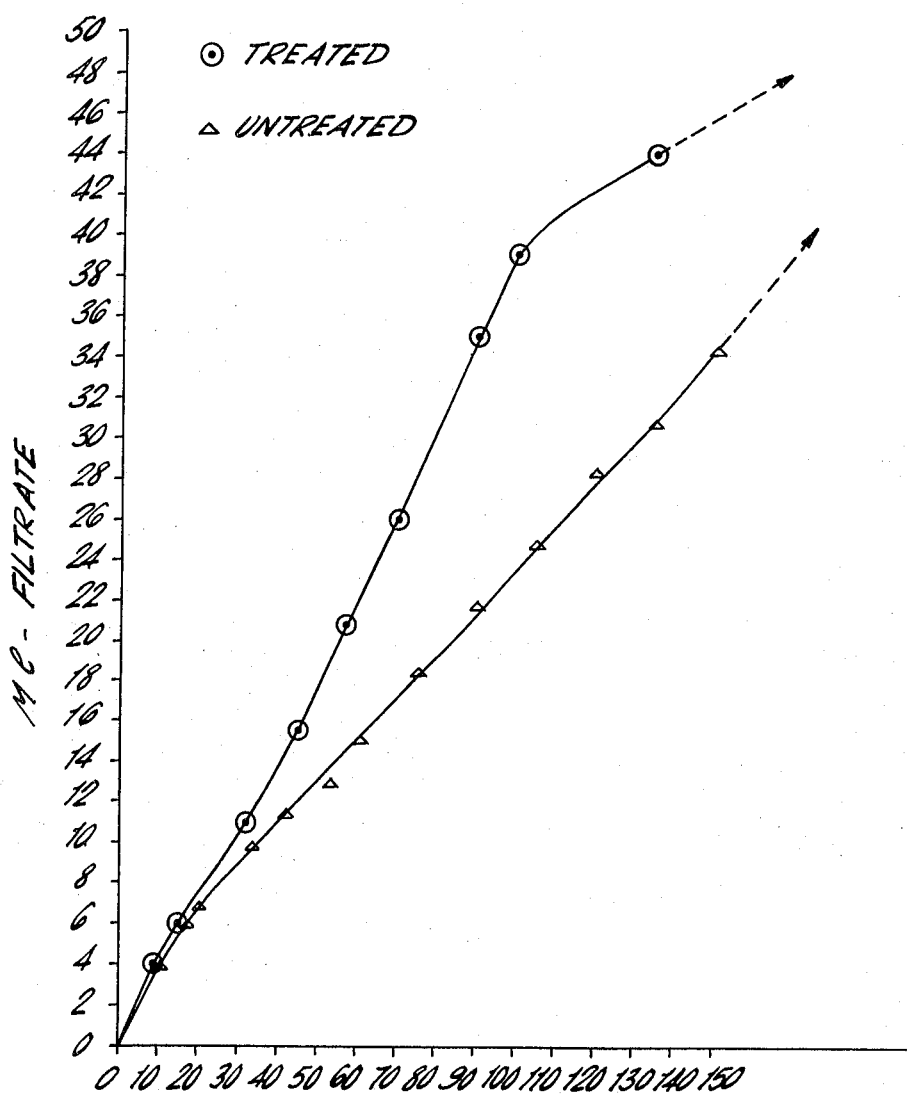

In the accompanying drawings:

FIG. 1 is a graph of ml. filtrate as ordinate and time in minutes as abscissa of treated and untreated suspension of an industrial $H_3PO_4$ slurry containing 50% $H_3PO_4$ and 25% solids, showing filtration under gravity at room temperature; and FIG. 2 is a graph of ml. filtrate as ordinate and time in minutes as abscissa of treated and untreated suspensions of $H_3PO_4$ suspension containing 54% $P_2O_5$ and 5% solids, with 100 g. suspension occupying 58 ml., showing filtration under vacuum.

6. Examples of the invention

The following examples serve as illustrations of the carrying out of the improved processes of this invention for the preparation of high strength phosphoric acid (e.g. higher than 60–85% by weight) from phosphate rock and sulfuric acid. Dilution, followed by filtration and then concentration by evaporation is generally and, in fact, desirably avoided by the improved process. However, the agglomeration may also be carried out on a diluted slurry, since the agglomeration step is still advantageous. In addition, filtration may also be used as the separation step, since the agglomeration step is similarly advantageous.

EXAMPLE I

About 200 grams of phosphate rock (37.5% $P_2O_5$=75 grams $P_2O_5$) with 60% of a size: −200 mesh Tyler, were reacted with 640 g. of 86.2% $H_3PO_4$ and 400 g. 85.2% $H_3PO_4$. The system was digested for 1 hour at room temperature, then divided into two equal parts: Part A and Part B.

Part A was reacted with 92.5 g. of 97% $H_2SO_4$. The system was digested for about 1 hour. Copious quantities of gas and forth were given off from the somewhat dilatant suspension.

(a) A 100 gram aliquot of (A) containing about 17.4% $CaSO_4$ by weight was treated at 100° C. with about 0.1 g. of sulfonic acid of branched alkyl benzene and about 0.1 ml. kerosene (1.4 v./v. v./o). The system was subjected to very vigorous agitation for about 5 minutes in order to promote activation of the calcium sulfate particles. The consistency of the suspension changed from virtually a semisolid to a viscous free-flowing fluid. This sample and an untreated blank were placed in test tubes inclined in an oil bath at 120° C. Gases escaped easily from the treated sample, whereas the untreated sample frothed vigorously. There was about 25% clear liquid in the treated sample while settling was not observed in the untreated sample while standing overnight.

(b) Part B was diluted with 303 grams water, then reacted with 92.5 grams of 97% sulfuric acid. The slurry contained about 12% calcium sulfate and about 88% of 64.3% $H_3PO_4$ by weight. The following two procedures were carried out with the slurry so formed:

(b)(i) About 100 grams of the slurry formed in (B) were agitated with 0.1 grams sulfonic acid of branched alkyl benzene and about 0.2 ml. kerosene by a horizontal reciprocating motion for 15 minutes. Substantial agglomeration of the calcium salt occurred so that it was possible to filter the phosphoric acid with filter paper without suction, while without the agglomeration, filtering was impossible.

(b)(ii) About 100 gram sample of the slurry formed in Part b above was weighed in an 8 oz. jar with 0.1 gram sulfonic acid of branched alkyl benzene and about 0.1 ml. kerosene (2.1 v./v. percent). The suspension was mixed for 30 minutes by a horizontal reciprocating motion. The results obtained after standing at room temperature for about 20 hours are shown below:

|  | Cm. |
|---|---|
| Height | 2.65 |
| Clear acid | 1.55 |
| Sediment height | 1.1 |

This compares to no visible sedimentation with the untreated sample.

EXAMPLE II

A master suspension (Master Suspension No. 1) was prepared with phosphate rock (37.5% $P_2O_5$, with 60% of a size: —200 mesh Tyler) calcined at 800° C. for two hours. About 100 grams of rock were mixed with 270 ml. water, then reacted with 800 grams 85.2% $H_3PO_4$. The slurry was digested at room temperature for 1 hour, then 92.5 grams of 97% $H_2SO_4$ were added to form calcium sulfate and liberate $H_3PO_4$ from $Ca(H_2PO_4)_2$. This suspension contains about 10.6% $CaSO_4$ by weight and 89.4% of 65.5% of phosphoric acid. The temperature was raised to 70° C. to eliminate corrosive gases.

(a) Aliquots of 100 grams each of Master Suspension No. 1 were vigorously stirred with a motor stirrer for 15 minutes in the presence of 0.1 g. of the following surface active agents and 0.2 ml. kerosene:

*i*: Control (stirred only)
*ii*: Sodium sulfonate of linear alkyl benzene
*iii*: Petroleum sulfonate (known by the trademark of Bryton 430)
*iv*: Sulfonic acid of branched alkyl benzene.

After this treatment, the suspensions were poured into 2.5 cm. (internal diameter) Pyrex (trademark) test tubes and placed in an oil bath at 110–115° C. overnight. The results obtained are summarized below:

|  | Height, cm. | | | Percent clear liquid |
|---|---|---|---|---|
|  | Suspension | $H_3PO_4$ | Sediment |  |
| Sample: |  |  |  |  |
| i | 10.0 | 0.2 | 9.8 | 2.0 |
| ii | 10.3 | 4.2 | 6.1 | 40.8 |
| iii | 11.2 | 3.8 | 7.4 | 33.9 |
| iv | 10.8 | 7.3 | 2.5 | 67.7 |

Unexpected excellent results were obtained when the calcium sulfate particles were treated (as defined herein) both with the various surfactants first and with a bridging liquid, e.g. kerosene. The amount of the bridging liquid used was substantially of the same order as the volume of the calcium sulfate. Separation of the salt substantially free of phosphoric acid occurred on controlled agitation by the formation of coherent agglomerates. Because of the nature of the agglomerates produced by the combination of the surfactants and the bridging liquid, almost none of the $H_3PO_4$ is entrained or entrapped by the calcium sulfate being separated. Consequently, there is usually more than 99% recovery of $H_3PO_4$.

The following serves as an illustration of this recovery technique:

EXAMPLE III

Another master suspension (Master Suspension No. 2) was prepared as follows:

About 100 grams of phosphate rock calcined at 800° C. ($P_2O_5$=37.5%) with 60% of a size: —200 mesh Tyler were added slowly to 870 grams of 85% strength phosphoric acid. The temperature was raised to about 70° C. and mixture stirred with a motor stirrer for several hours. Then the system was reacted with 92.5 grams of 95.5–96.5% sulfuric acid, while stirring the suspension to a smooth consistency free from unreacted material.

(a) About 100 grams of Master Suspension No. 2 containing about 12% by weight $CaSO_4$ and 88% by weight of 85–86% $H_3PO_4$ were agitated in a tightly stoppered glass bottle containing about 0.25 gram of sulfonic acid of branched alkyl benzene as the surfactant. The conditioned $CaSO_4$ particles were collected in an oleaginous phase using about 4.6 ml. kerosene by shaking the suspension with a mixer known by the trademark of Spex Mixer for 15–30 minutes followed by rotation at 60–120 r.p.m. Discrete bodies of calcium sulfate formed. The clear concentrated phosphoric acid was decanted. The acid adhering to the surface of the calcium sulfate bodies and glass bottle was washed by rinsing several times with a small volume of water.

The ashed calcium sulfate contained 1.5% phosphorus. About 99.2% of the entire phosphoric acid was recovered from the system, or about 90% of the phosphorus contained in the rock.

(b) About 100 grams of Master Suspension No. 2 to which about 0.34 g. sodium sulfonate of linear alkyl benzene had been added were shaken in a tightly stoppered glass bottle using a Spex Mixer. The conditioned $CaSO_4$ particles were collected as discrete bodies by shaking the suspension with about 4.6 ml. kerosene in the Spex Mixer followed by rotation at 60–120 r.p.m. as in Example III(a). The clear concentrated (about 85% strength) phosphoric acid was decanted and the acid adhering on the surface of the agglomerated bodies was substantially removed as in Example III(a).

The ashed calcium sulfate product contained 1.1% P. This accounts for 0.49 g. of 85% phosphoric acid; thus a recovery of 99.4% of the phosphoric acid present was obtained.

(c) About 100 g. of Master Suspension No. 2 were shaken with 0.25 g. dodecyl benzene sulfonic acid (known by the trademark of Hartex) in a tightly stoppered bottle by means of a Spex Mixer. The conditioned calcium sulfate particles were collected using about 4.6 ml. kerosene as described in Example III(a).

The ashed calcium sulfate product contained 1.8% P. About 99.0% of the phosphoric acid was recovered.

(d) About 182.5 g. of Master Suspension No. 2 to which about 0.4 g. sodium sulfonate of linear alkyl benzene had been added were agitated in a paint shaker for 1 hour. About 8.6 ml. kerosene were then added and the system was agitated again for 30 minutes. Large discrete bodies of calcium sulfate formed while rotating the treated material at 60–120 r.p.m. The concentrated phosphoric acid was decanted as a clear free-flowing liquid. The resulting agglomerates of gypsum containing some phosphorus therein are useful as soil conditioners.

EXAMPLE IV

Another master suspension (namely, Master Suspension No. 3) was prepared as follows:

About 100 g. phosphate rock which had been calcined at 800° C. ($P_2O_5$=37.5%) were added slowly to 870 g. of 85–87% phosphoric acid. The suspension was digested for 1 hour at about 70° C. The $Ca(H_2PO_4)_2$ was then reacted with 92.5 g. of 95.5–96.5% $H_2SO_4$ in order to form $CaSO_4$ and $H_3PO_4$. The suspension contained about 12% by weight of $CaSO_4$. The $H_3PO_4$ had a concentration of 85% or more orthophosphoric acid.

(a) 100 grams of Master Suspension No. 3 and 0.3 gram of sulfonic acid branched chain alkyl benzene contained in a 4 oz. jar were agitated for 30 minutes by means of a Spex Mixer. The suspension became a stiff paste or gel. Then 4.6 ml. Varsol (Registered Trademark) were added and the paste separated while being agitated for 20 minutes in the Spex Mixer. Agglomerated bodies of about 3–6 mm. in diameter were obtained after rotating the system at 128 r.p.m. for 20 minutes. These agglomerates quickly settled and the $H_3PO_4$ could be decanted.

(b) 100 grams of the $H_3PO_4$ —$CaSO_4$ Master Suspension No. 3 produced in Example IV and 0.35 gram of the sodium sulfonate of linear alkyl benzene were agitated in a 4 oz. jar for 30 minutes by means of a Spex Mixer. The system became gelled. About 4.4 ml. of an atmospheric light gas oil (namely, a low boiling hydrocarbon oil, having a refractive index at 20° C. of 1.4628, an A.P.I. gravity of 38.8 and a viscosity, S.U.S. at 100° F.=33.1) was added and the system was agitated for 30 minutes in the Spex Mixer. The gel separated and the calcium sulfate agglomerated into large bodies while rotating the treated suspension at 128 r.p.m. for 5 hours.

(c) About 100 g. of Master Suspension No. 3 containing about 12% by weight of $CaSO_4$ were agitated with 0.35 g. dodecyl sodium sulfate in a 4 oz. jar for 30 minutes by means of a Spex Mixer. The system became gelled. The system separated after about 4.4 ml. of Varsol were added as the bridging liquid and the system agitated for 90 minutes by means of the Spex Mixer. The resulting dispersion was rotated at 128 r.p.m. for 5 hours to give agglomerates of $CaSO_4$ up to 6 mm. diameter.

EXAMPLE V

Another master suspension (namely, Master Suspension No. 4) of phosphoric acid containing 13.9% $CaSO_4$ was prepared as follows:

About 100 g. calcined phosphate rock was added slowly to 705 g. 86% phosphoric acid while stirring. The reaction product was digested for 18 hours. The $Ca(H_2PO_4)_2$ formed was reacted with 92.5 g. of 97% $H_2SO_4$ to liberate phosphoric acid and to form $CaSO_4$. The suspension was stirred for 18 hours at 70° C. in order to liberate corrosive gases.

(a) About 100 g. of Master Suspension No. 4 was agitated in a 4 oz. jar containing 0.35 g. of the sulfonic acid of branched alkyl benzene for 30 minutes by means of a Spex Mixer. The system became gelled. The system was agitated again in the presence of 4.6 ml. Varsol for 30 minutes in a Spex Mixer. The gel separated and the calcium sulfate in small agglomerates formed larger masses by rotating the suspension at 128 r.p.m. for 5 hours.

(b) About 100 g. of Master Suspension No. 4 with about 0.1 g. sulfonic acid of branched alkyl benzene were dispersed in a 4 oz. jar by means of a Spex Mixer for 30 minutes. The system became gelled. About 4.6 ml. Varsol were added and the system agitated for 30 minutes in the Spex Mixer. The suspension still appeared emulsified. After a further 0.05 g. surfactant were added, agglomerates of calcium sulfate of about 0.2 mm. in diameter were obtained by agitating the suspension again for 30 minutes in the Spex Mixer, followed by rotation at 128 r.p.m. for 16 hours.

(c) About 50 g. of Moster Suspension No. 4 was treated with 2.3 ml. Varson containing 0.15 g. of a sulfonic acid of branched alkyl benzene. The suspension was agitated in a 4 oz. jar for 15 minutes by means of the Spex Mixer. Agglomerates of calcium sulfate of about 1 mm. in diameter were obtained. The small agglomerates formed masses of about 6 mm. in diameter after rotating the jar and contents for 15 minutes at about 120 r.p.m.

(d) About 50 g. of Master Suspension No. 4 were agitated with 2.3 ml. Versol in a 4 oz. jar for 20 minutes in a Spex Mixer. A weak emulsion was obtained. Small agglomerates of calcium sulfate were obtained by adding 0.15 g. of a sulfonic acid of branched alkyl benzene to the system followed by 10 minute agitation with the Spex Mixer. The small agglomerates condensed and formed bodies of 3–6 mm. in diameter after about 1 hour rotation at 120 r.p.m. in the jar.

EXAMPLE VI

This example demonstrates the utility of this invention on an industrial phosphoric acid slurry containing 25% by weight solids, and 50% $H_3PO_4$, whereby 100 g. suspension was approximately 62 ml.

100 g. suspension was treated with 0.1 g. (0.4% based on weight of solid) sodium sulfonate of alkyl benzene and 0.5 ml. kerosene [approximately $$\frac{0.5}{25} \times 100 = 5\%$$

by volume (absolute) based on the volume of solids], and agitated well. The treated slurry was filtered under gravity at room temperature. For the purpose of comparison, another 100 g. aliquot of untreated material was filtered under gravity. The results are shown below.

| Sample | Time (minutes) | Ml. clear filtrate |
| --- | --- | --- |
| Blank (untreated) | 1 | 2.5 |
|  | 2 | 3.5 |
|  | 3 | 4.5 |
|  | 5 | 6.4 |
|  | 7 | 6.9 |
|  | 10 | 6.9 |
|  | 15 | 6.9 |
| Treated | 1 | 4.5 |
|  | 2 | 8.4 |
|  | 3 | 11.0 |
|  | 5 | 14.9 |
|  | 7 | 17.9 |
|  | 10 | 20.5 |
|  | 12 | 22.0 |
|  | 15 | 22.8 |
|  | 20 | 23.0 |

As seen above, the treated sample filtered faster, and also more phosphoric acid was separated. The untreated sample reached a steady state after 7 minutes filtering time.

About 17.9 ml. filtrate were obtained from the treated sample after 7 minutes filtering and only 6.9 ml. filtrate from the control.

The results are also shown graphically in FIG. 7, which is a graph of ml. filtrate as ordinate and time, in minutes, as abscissa. The fact that after 10 minutes filtration time the amount of $H_3PO_4$ filtrate from the treated suspension is about three times that of the untreated suspension is clearly seen.

EXAMPLE VII

This example demonstrates the utility of this invention on a phosphoric acid slurry containing 25% by weight solids, and 50% $H_3PO_4$, so that 100 g. of suspension is approximately 62 ml.

100 g. suspension was treated with 0.1 g. sodium sulfonate of alkyl benzene (0.4% by weight, based on the weight of solids) and 0.5 ml. kerosene [5% by volume (absolute) based on the volume of solids]. The treated suspension was filtered under vacuum at room temperature. Similarly, for comparison, 100 g. untreated suspension were filtered under vacuum at room temperature. The results are tabulated briefly below.

RESULTS

| Time (minutes) | Ml. of filtrate | |
| --- | --- | --- |
| | Treated | Untreated |
| 4 | 32 (clear) | 17. |
| 16 | 35.5 | |
| 60 | | 32 ml. (cloudy). |

It is seen that, not only does the suspension treated according to the present invention filter quicker, but it also is clear rather than cloudy, and the recovery is 3.5 ml. greater, i.e. about 11% more.

EXAMPLE VIII

About 100 g. lots of phosphoric acid slurry containing 54% $P_5O_2$ and 5% solids were treated by a microspherical agglomeration technique using a proportion of 10 lbs. of surfactant per ton of solid (0.5% by weight), and 20 lbs. of kerosene per ton of solid [3% by volume (absolute)].

(a) The treated suspension and a similar amount of untreated material were filtered under vacuum at an elevated temperature using a fritted glass filter. The filtering rate was almost twice as great as with the treated slurry at about 40° C. In addition, approximately 93% of the total volume (i.e. 54 ml.) was eventually recovered as a filtrate compared to 83% (i.e. 48 ml.) from the untreated slurry, i.e. an improvement which is about 11% greater.

These results are shown graphically in FIG. 2, which shows clearly the benecial effects of filtration under suction using the process of the present invention.

(b) A laboratory clinical centrifuge was used to centrifuge 100 g. of treated slurry and 100 g. of untreated slurry. The untreated slurry was cloudy after centrifuging for 1 hour, while the treated slurry was clear.

EXAMPLE IX

Another commercial phosphoric acid suspension containing 25% solids in 50% phosphoric acid filtered three times faster under gravity was treated above in Example VI and its filterability was compared to the control (untreated suspension). The volume of clear liquid which separated freely was about 11% from the untreated, and 37% from the treated suspension.

COMPARATIVE EXAMPLE A

About 100 g. of Master Suspension No. 3 were weighed in a 4 oz. jar containing 5.0 g. of the sodium sulfonate of linear alkyl benzene. The suspension was agitated in a paint shaker for 75 minutes. A stiff paste or gel was obtained. The gelled suspension was rotated at 120 r.p.m. for 20 hours, but the calcium sulfate did not agglomerate. About 1 g. of the same surfactant was added to the suspension and the contents agitated again for 45 minutes in the paint shaker. The stiff paste or gel still persisted. The system was agitated by means of a Spex Mixer for 30 minutes and a more viscous gel resulted. Agglomerated bodies of calcium sulfate were not observed and the gel persisted even after rotating the system again for 20 hours at 128 r.p.m.

COMPARATIVE EXAMPLE B

About 100 g. of Master Suspension No. 3 were weighed in a 4 oz. jar containing 5.0 g. sulfonic acid of branched chain alkyl benzene. The suspension containing about 12% $CaSO_4$ by weight was agitated vigorously in a paint shaker for 75 minutes. The system became gelled. The contents were rotated at 128 r.p.m. for 20 hours but the gel persisted and agglomeration of calcium sulfate did not occur. The system remained gelled and the calcium sulfate did not agglomerate even after an additional 2.0 g. of the same surfactant were added, the dispersion agitated for 45 minutes in a paint shaker, for 30 minutes by means of the Spex Mixer, and rotated again at 128 r.p.m. for 20 hours.

COMPARATIVE EXAMPLE C

About 50 g. of Master Suspension No. 4 were agitated with 2.3 ml. Varsol in a 4 oz. jar for 20 minutes in a Spex Mixer. The Varsol dispersed in the system but agglomerates were not obtained. Separation of the calcium sulfate from the phosphoric acid did not take place even with a prolonged agitation with the Spex Mixer and rotation of the jar and contents of 120 r.p.m.

COMPARATIVE EXAMPLE D

About 50 g. of Master Suspension No. 4 was treated with 0.2 g. of Armac TD (a tallow amine acetate of Armor Chemical Company) and 2.3 ml. of Varsol. The suspension was agitated for 40 minutes by means of a Spex Mixer. No agglomerates of calcium sulfate were obtained.

The above comparative examples illustrate that the agglomeration of the calcium sulfate particles does not take place by using a surfactant selected from the group consisting of straight chain alkyl benzene sulfonic acids, branched chain alkyl benzene sulfonic acids, straight chain alkyl benzene sulfonates, branched chain alkyl benzene sulfonates, straight chain alkyl sulfates, branched chain alkyl sulfates and petroleum sulfonates in the absence of a bridging liquid selected from liquid petroleum hydrocarbons and liquid nonpetroleum hydrocarbons or by using the bridging liquid in the absence of the surfactant.

By carrying out the process described herein of embodiments of this invention, it is now possible to produce higher strengths of phosphoric acid than can be produced by the procedures now in general use. The agitation step, as described above, may be carried out vigorously and quickly with reciprocating motion, followed by a rotational motion of slower speed than the reciprocating motion. The high strength phosphoric acid (of 60–75% by weight or more $H_3PO_4$) may be separated directly from the calcium sulfate by the simple step of decanting or draining off the phosphoric acid from the agglomerated calcium sulfate. The agitation step, as described above, may be carried out vigorously and quickly with reciprocating motion, followed by a rotational motion of slower speed than the reciprocating motion. There is thus no need to dilute the phosphoric acid to such a degree that the calcium sulfate may be separated from the phosphoric acid by filtration. Consequently, there is no need to evaporate water from the diluted phosphoric acid to form concentrated phosphoric acid.

The agglomerated calcium sulfate particles are useful per se as a fertilizer and soil conditioner. They are first dried at a temperature of about 100° C. to form strong substantially non-dusting granules. Furthermore, they are to be calcined at a temperature of about 200° C. or more. The calcining may be carried out in such a manner that the hydrocarbon bridging liquid may be recovered.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention and adapt it to various usages and conditions. Consequently, such changes and modifications are properly, equitably, and "intended" to be, within the full range of equivalence of the following claims.

We claim:
1. A process for the separation of phosphoric acid from a suspension of gelatinous or finely divided precipitate associated therewith comprising:
   (a) agitating the suspension both with a surfactant selected from the group consisting of straight chain alkyl benzene sulfonic acids, branched chain alkyl benzene sulfonic acids, straight chain alkyl benzene sulfonates, branched chain alkyl benzene sulfonates, straight chain alkyl sulfates, branched chain alkyl sulfates and petroleum sulfonates in an amount of about 0.1 to about 4% by weight, based on the weight of solids in the suspension, and with a bridging liquid consisting of a liquid hydrocarbon in an amount of not less than about 1% by volume (absolute) of the solids in the suspension until substantially complete production of agglomerates of said precipitate are formed; and
   (b) then separating the phosphoric acid from the agglomerates.
2. The process of claim 1 wherein the bridging liquid is used in an amount of from about 2% to about 150% by volume (absolute).
3. The process as claimed in claim 2 wherein Step (a) comprises:
   (i) treating said suspension with said surfactant; and
   (ii) then agitating the so-treated suspension with said bridging liqud.
4. The process of clam 2 wherein Step (a) comprises a "one-step" process where both the surfactant and the bridging liquid are used substantially simultaneously.
5. The process of claim 2 wherein Step (a) comprises:
   (i) treating said suspension with said bridging liquid; and
   (ii) then agitating the so-treated suspension along with said surfactant.
6. The process of claim 2 wherein said Step (b) comprises decanting the phosphoric acid from the settled agglomerates.
7. The process of claim 2 wherein said Step (b) comprises a filtering step.
8. The process of claim 2 wherein said Step (b) comprises a centrifuging step.
9. The process of claim 2 wherein said suspension is formed by reacting a phosphate rock with concentrated phosphoric acid, thereby to form a suspension of superphosphate and phosphoric acid, and wherein the superphosphate is reacted with sulfuric acid, thereby forming phosphoric acid and calcium sulfate in finely divided or gelatinous form.
10. The process of claim 2 wherein the surfactant is dodecyl benzene sulfonic acid.
11. The process of claim 2 wherein the surfactant is dodecyl sodium sulfate.
12. The process of claim 2 wherein said bridging liquid is selected from the group consisting of naphtha, kerosene, fuel oils, low viscosity processed oils, gas oils, and petroleum aliphatic solvents.
13. The process of claim 12 wherein said bridging liquid is kerosene.
14. The process of claim 12 wherein said bridging liquid is a straight petroleum aliphatic solvent.
15. The process of claim 12 wherein said bridging liquid is an atmospheric light gas oil.
16. The process of claim 2 wherein the agitating is carried out vigorously with a reciprocating motion followed by a rotational motion of slower speed than the reciprocating motion.
17. The process of claim 7 wherein said filtration step is assisted by vacuum.
18. The process of claim 17 wherein said filtration step is commenced while the suspension is at elevated temperature.

References Cited
UNITED STATES PATENTS
3,192,014   6/1965   Leyshon et al.
3,397,956   8/1968   Buchanan et al.

OSCAR R. VERTIZ, Primary Examiner

G. HELLER, Assistant Examiner

U.S. Cl. X.R.
423—319; 210—52